US008148861B2

(12) United States Patent
Baudelocque et al.

(10) Patent No.: US 8,148,861 B2
(45) Date of Patent: Apr. 3, 2012

(54) CANNED OR SLEEVED ROTARY MACHINE AND METHOD OF MANUFACTURING IT

(75) Inventors: Luc Baudelocque, Vernon (FR); David Moulin, Paris (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 84 days.

(21) Appl. No.: 12/537,593

(22) Filed: Aug. 7, 2009

(65) Prior Publication Data

US 2011/0001377 A1   Jan. 6, 2011

(30) Foreign Application Priority Data

Jul. 3, 2009  (FR) ...................................... 09 54578

(51) Int. Cl.
*H02K 5/132* (2006.01)
*H02K 5/14* (2006.01)

(52) U.S. Cl. ............................................. 310/87; 310/88
(58) Field of Classification Search .................... 310/88, 310/89, 90.5, 87
See application file for complete search history.

(56) References Cited

U.S. PATENT DOCUMENTS

| 4,500,142 | A | * | 2/1985 | Brunet | 310/90.5 |
| 5,973,430 | A | * | 10/1999 | Brunet | 310/90.5 |
| 6,350,109 | B1 | * | 2/2002 | Brunet et al. | 417/365 |
| 6,373,156 | B2 | * | 4/2002 | Suzuki et al. | 310/68 B |
| 7,545,066 | B2 | * | 6/2009 | Baudelocque et al. | 310/90.5 |
| 2007/0164627 | A1 | * | 7/2007 | Brunet et al. | 310/90.5 |

FOREIGN PATENT DOCUMENTS

| EP | 0 415 046 | 3/1991 |
| EP | 1 624 167 | 2/2006 |
| EP | 1 830 081 | 9/2007 |
| FR | 2 768 470 | 3/1999 |

* cited by examiner

*Primary Examiner* — Tran Nguyen
(74) *Attorney, Agent, or Firm* — Weingarten, Schurgin, Gagnebin & Lebovici LLP

(57) ABSTRACT

A canned or sleeved rotary machine is equipped with a rotor (101) in contact with a particle-laden, acidic or corrosive gaseous atmosphere, and with a functional electrical assembly such as a magnetic bearing comprising a rotor armature (106) secured to the rotor (101) and placed in the gaseous atmosphere and a stator armature (104) secured to a stationary support (102) and positioned facing the rotor armature (106), the stator armature (104) comprising at least one winding (142, 143) and a ferromagnetic body (141) which are positioned in a protective metal enclosure comprising a solid part secured to the stationary support (102) or coincident therewith, a thin can or sleeve (103) and a hermetic passage (108) for wiring (108*a*) supplying the windings (142, 143). A potting compound (107) fills residual internal gaps left in the ferromagnetic body (141), the windings (142, 143) and the wiring (108*a*), and a dead volume (109) in which the pressure is below atmospheric pressure is created inside the protective metal enclosure (102, 103, 108).

11 Claims, 2 Drawing Sheets

CANNED OR SLEEVED ROTARY MACHINE AND METHOD OF MANUFACTURING IT

FIELD OF THE INVENTION

The subject of the present invention is a canned or sleeved rotary machine equipped with a rotor in contact with a particle-laden, acidic or corrosive liquid or gaseous atmosphere and the invention relates more specifically to a rotary machine equipped with sleeved magnetic bearings, with sleeved detectors for magnetic bearings and/or with a canned electric motor.

The invention also relates to a method of manufacturing such a machine.

PRIOR ART

FIG. 3 depicts an example of a sleeved radial magnetic bearing which comprises a rotor armature 6 secured to a rotor shaft 1 in contact with an aggressive atmosphere, and a stator armature 4 secured to a stationary support 2, the stator armature 4, which comprises one or more windings 42 and a ferromagnetic body 41, being positioned in a protective metal enclosure comprising a solid part secured to the stationary support 2 or coincident therewith, a thin can or sleeve 3 and a hermetic passage 8 for wiring 8a supplying the windings 42. The thin can or sleeve 3 of thickness e0 is situated a distance □ from the rotor armature 6 in order to define the air gap of the magnetic bearing.

A potting compound 7 fills almost all of the internal voids left in the ferromagnetic body 41, the windings 42 and the wiring 8a so that the thin can or sleeve 3 can rest against a flat or cylindrical surface when the bearing or its associated detector is placed in a pressurized environment.

FIG. 4 similarly shows an example of a sleeved axial magnetic bearing which comprises a rotor armature 106 in the form of a disk fixed at right angles to the axis of a rotor shaft 101 in contact with an aggressive atmosphere, and a stator armature 104 secured to a stationary support 102. The stator armature 104 comprises windings 142, 143 and a ferromagnetic body 141, which are placed in a protective metal enclosure comprising a solid part secured to the stationary support 102 or coincident therewith, a thin can or sleeve 103 and a hermetic passage 108 for wiring 108a supplying the windings 141, 142. An air gap of magnitude $\Delta$ is defined between the rotor armature 106 and the thin can or sleeve 103 of thickness e0.

As in the case of the sleeved radial magnetic bearing of FIG. 3, a potting compound 107 fills almost all of the internal voids left in the ferromagnetic body 141, the coils 142, 143 and the wiring 108a so that the thin can or sleeve 103 can rest against a flat or cylindrical surface when the bearing or its associated detector is placed in a pressurized environment.

In the case of the known magnetic bearings of FIGS. 3 and 4, whatever the technology employed, it is very difficult to guarantee that, on the one hand, the protective enclosure will be perfectly filled or, on the other hand, that this same enclosure will be perfectly hermetic. The overall leak rates generally observed are of the order of $1\times10^{-8}$ mbar·l/s (rate measured under helium at 1 bar gauge).

The sleeved bearing assembly is intended to be positioned in a gaseous environment at a variable pressure that fluctuates with the treatment process (typically from 1 to 200 bar).

The protective enclosure consists of the armatures 2, 3, 8 or 102, 103, 108. Because the armature consisting of the can or sleeve 3 or 103 has a thickness (e0) of the order of 0.5 to 1 mm, an internal pressure of the enclosure that is raised by comparison with the external pressure may be enough to deform the can or sleeve 3 or 103 to such an extent that the air gap ($\Delta$) typically measuring 0.5 to 1 mm disappears, leading to destruction of the can sleeve 3 or 103 though contact with the rotor armature 6 or 106 facing it.

It is thus possible to calculate that, with the aforementioned leak rate of $1\times10^{-8}$ mbar·l/s, a volume of 1 cm$^3$ placed in a gas at 100 bar above the internal pressure of the enclosure 2, 3, 8, or 102, 103, 108, respectively, increases in pressure by 1 bar in about 12 days.

It should be noted that when use is made of a very thin and wide can or sleeve 3, 103, as is notably the case for a sleeve 103 of an axial bearing, the slightest raised internal pressure deforms the sleeve, this deformation being elastic deformation first of all, then plastic deformation.

Considering the example of an axial thrust bearing with a diameter of 450 mm, fitted with a sleeve 103 with a thickness of 0.5 mm, it can be calculated that an increase in pressure of 0.1 bar is enough to cause the sleeve 103 to deflect by 1 mm, thus filling the air gap ($\Delta$). This pressure rises to 0.6 bar if the sleeve has a thickness of 1 mm. A raised pressure of some intermediate value gives a deflection of some intermediate magnitude.

In the case of sleeved bearings of the prior art, the protective enclosure is closed under atmospheric conditions and the residual gaps internal to the enclosure have a high oxygen content. Because sleeved bearings are generally used in a natural gas (CH$_4$) environment, the leaks create a potentially explosive environment inside the enclosure.

In any event, the raised internal pressure in excess of atmospheric pressure created inside an enclosure as a result of the accumulation of leaks over time will, in the event of depressurization, cause the can or sleeve to deform to an extent that may go so far as to fill the air gap $\Delta$ and damage the bearing.

DEFINITION AND SUBJECT MATTER OF THE INVENTION

It is an object of the present invention to remedy the aforementioned disadvantages and, in particular, to tolerate, in a canned or sleeved assembly for a rotary machine, such as a sleeved radial or axial magnetic bearing, a sleeved detector associated with such a bearing and/or a canned electric motor, an increase in internal pressure due to leakages with no risk of deformation in the event of depressurization of the environment in which it is positioned, to thus considerably increase the service intervals and to guarantee that an explosive mixture cannot be stored.

These objects are achieved, according to the invention, by virtue of a canned or sleeved rotary machine equipped with a rotor in contact with a particle-laden, acidic or corrosive liquid or gaseous atmosphere, and with a functional electrical assembly comprising a rotor armature secured to the rotor and placed in said gaseous atmosphere and a stator armature secured to a stationary support and positioned facing said rotor armature, the stator armature comprising at least one winding and a ferromagnetic body which are positioned in a protective metal enclosure comprising a solid part secured to the stationary support or coincident therewith, a thin can or sleeve and a hermetic passage for wiring supplying said windings, a potting compound filling residual internal gaps left in the ferromagnetic body, the windings and the wiring, wherein a dead volume in which the pressure is below atmospheric pressure is created inside the protective metal enclosure.

The dead volume is preferably formed behind the hermetic passage.

More particularly, the protective metal enclosure comprises a drilling so that the vacuum can be created in said dead volume and a blanking plug welded in position to plug said drilling while at the same time maintaining the vacuum.

The dead volume may have a capacity in excess of 100 cm$^3$ and even of the order of several hundred cm$^3$.

The thin can or sleeve has a thickness of between 0.3 and 2 mm, and preferably of between 0.4 and 1 mm.

The air gap $\Delta$ between the rotor armature and the stator armature may preferably be between 0.4 and 3 mm.

The invention applies equally well to a radial bearing as to an axial bearing the stator armature of which collaborates with a rotor armature in the form of a disk perpendicular to the rotor.

The thin can or sleeve may, for example, be made of stainless steel of the 17-4 PH, 316L or 904L type or of inconel.

Another subject of the invention is a method of manufacturing a canned or sleeved rotary machine equipped with a rotor in contact with a particle-laden, acidic or corrosive liquid or gaseous atmosphere and a functional electrical assembly, comprising the steps that consist in forming a rotor armature and securing it to the rotor, forming, facing said rotor armature, a stator armature comprising at least one winding and a ferromagnetic body which are positioned in a protective metal enclosure comprising a solid part secured to the stationary support or coincident therewith, a thin can or sleeve and a hermetic passage for wiring supplying said windings, and in injecting into said protective metal enclosure a potting compound that fills the residual gaps left in the ferromagnetic body, the windings and the wiring, wherein a dead volume in which the pressure is below atmospheric pressure is created inside the protective metal enclosure.

More particularly, a drilling which opens into the dead volume is formed in the protective metal enclosure and a blanking plug that plugs the drilling is welded, for example by electron bombardment, into position while at the same time maintaining the vacuum.

BRIEF DESCRIPTION OF THE DRAWINGS

Other features and advantages of the invention will emerge from reading the following description of some particular embodiments of the invention which are given by way of examples with reference to the attached drawings, in which.

DETAILED DESCRIPTION OF THE PREFERRED EMBODIMENTS

Figure 1:
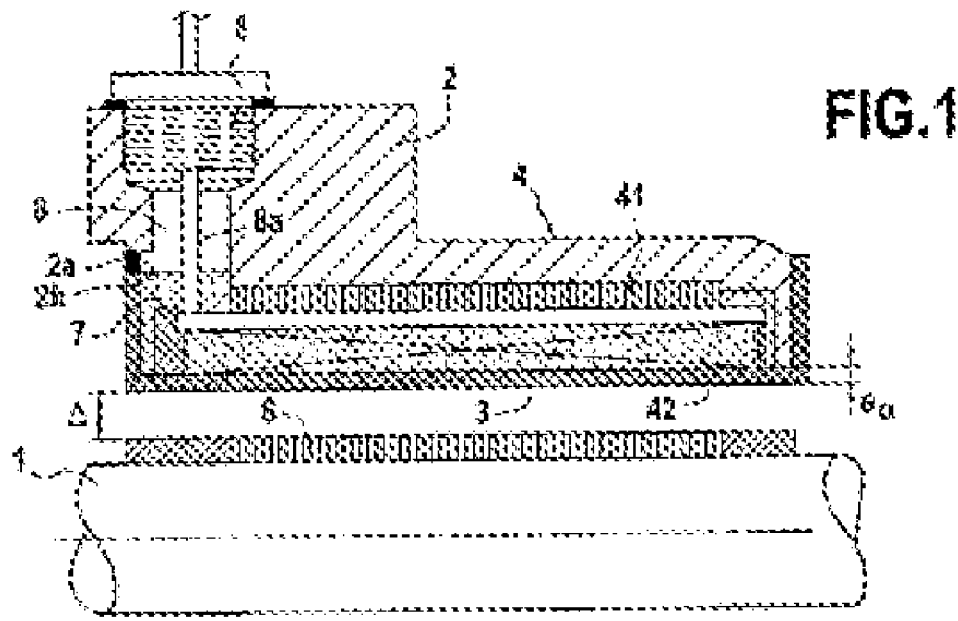
FIG. 1 is an axial half section of one embodiment of a sleeved radial magnetic bearing according to the invention.
Figure 2:
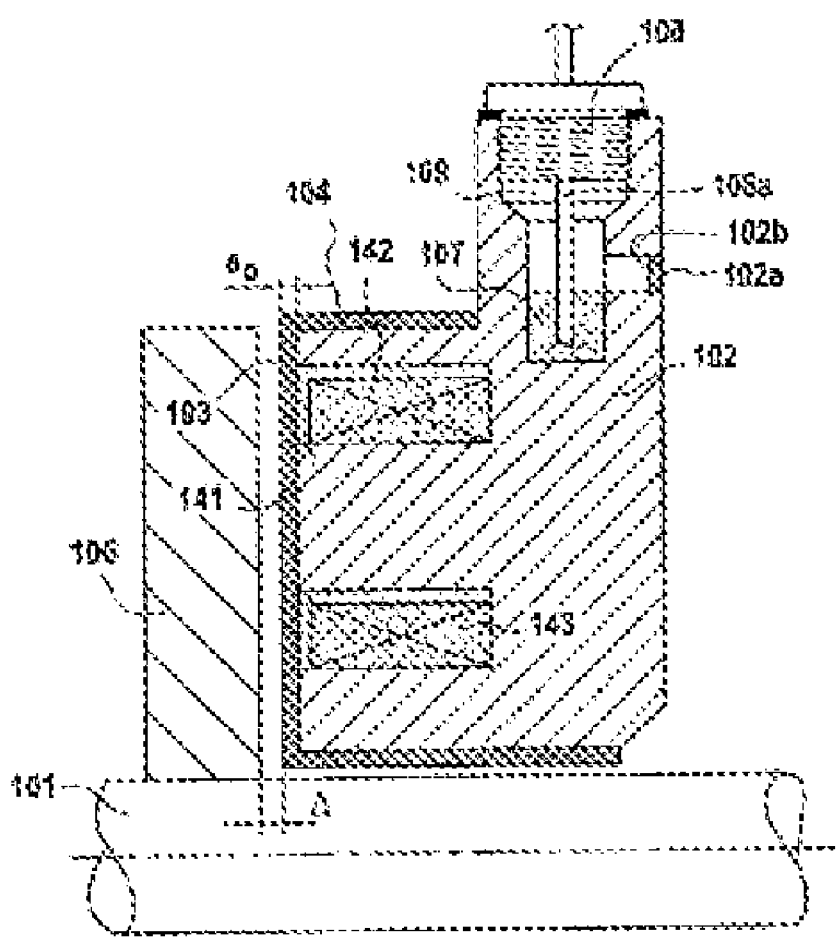
FIG. 2 is an axial half section of one embodiment of a sleeved axial magnetic bearing according to the invention.

FIGS. 1 and 2 show examples of sleeved magnetic bearings according to the invention.

Figure 3:
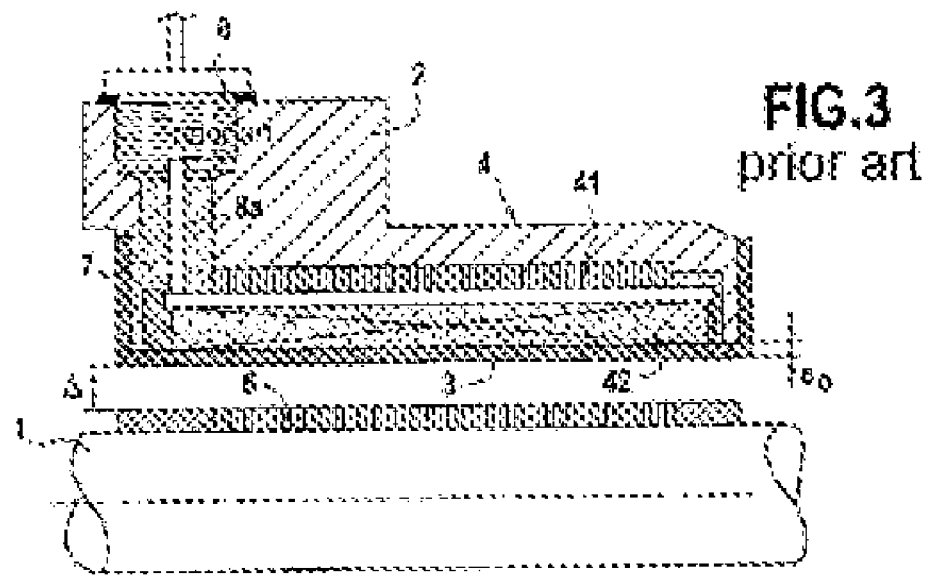
FIG. 3 is an axial half section of one example of a sleeved radial magnetic bearing according to the prior art.

Elements that are common to the sleeved radial magnetic bearing of FIG. 1 and the known sleeved radial magnetic bearing of FIG. 3 bear the same reference numerals and will not be described again.

Figure 4:
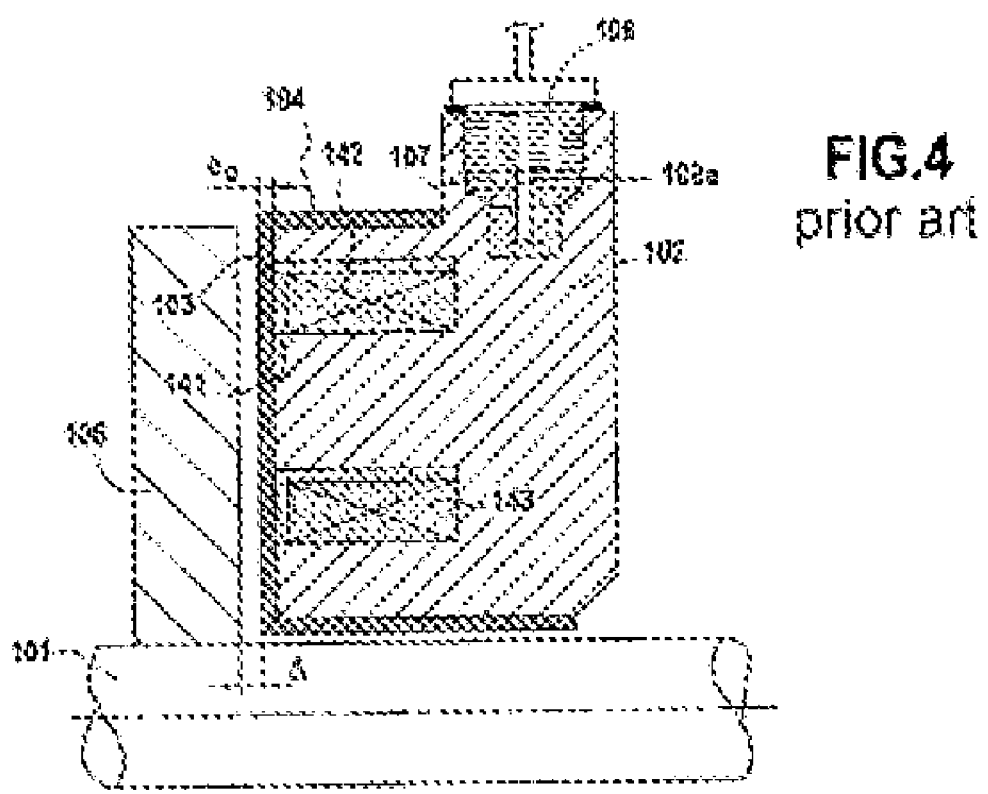
FIG. 4 is an axial half section of one example of a sleeved axial magnetic bearing according to the prior art.

Likewise, elements common to the sleeved axial magnetic bearing of FIG. 2 and the known sleeved axial bearing of FIG. 4 bear the same reference numerals and will not be described again.

According to the invention, a dead volume 9 (FIG. 1), or 109 (FIG. 2), in which the pressure is below atmospheric pressure, is created inside the protective metal casing 2, 3, 8, or 102, 103, 108, respectively. The dead volume 9, or 109, is formed behind the hermetic passage 8, or 108, provided for the wiring 8a, or 108a, that supplies the windings 42, or 142, 143, respectively. The potting compound 7, or 107, thus fills the residual gaps left in the ferromagnetic body 41, or 141, the windings 42, or 142, 143, and the wiring 8a, 108a, respectively, but a dead volume 9, or 109, is left near the hermetic passage 8, 108, respectively.

The dead volume 9, or 109, may have a capacity of a few hundreds of cm$^3$, for example between 100 and 400 cm$^3$, or may even have a higher capacity depending on the size of the rotary machine.

Furthermore, according to an important aspect of the present invention, the bearing is closed off maintaining the vacuum.

Thus, according to the invention, the radial or axial sleeved magnetic bearing is filled with a potting compound 7, or 107, leaving a vacuum 9, or 109, behind the hermetic passage 8, or 108, through which the wires 8a, or 108a are respectively led out.

A drilling 2b, or 102b, formed in the protective metal enclosure 2, 3, 8, or 102, 103, 108, respectively, allows access to be had to the dead volume 9, or 109, respectively, so that the vacuum can be created. The hermetic sealing of the whole can be tested under helium using this access 2b, or 102b, respectively.

A blanking plug 2a, or 102a, is then welded into position, maintaining the vacuum, for example using electron bombardment, in order to plug the drilling 2b, or 102b, respectively.

The dead volume 9, or 109, created in the bearing allows gas to be stored only through leaks in the walls, the welds, or the means of electrical connection that make up the protective metal enclosure of the bearing.

The dead volume 9, or 109, is designed to be large enough that leaks can be stored therein without leading to a raised pressure that might deform or damage the can or sleeve 3, or 103, respectively, in the event of depressurization. The can or sleeve 103 is particularly sensitive in the case of an axial bearing because the can or sleeve 103 is then very thin and wide.

Typically, a can or sleeve 3, or 103, respectively, has a thickness e0 of between 0.3 and 2 mm and preferably of between 0.4 and 1 mm, which is of the same order of magnitude as an air gap $\Delta$ defined between the rotor armature 6, or 106, and the stator armature 4, or 104, respectively.

The can or sleeve 3, 103 may, in particular, be made of magnetic stainless steel of the 17-4 PH type or of non-magnetic stainless steel 316L or 904L or alternatively may be made of inconel, although these materials are nonlimiting.

The addition of a dead volume 9, or 109, makes it possible to increase the life as a function of the pressure of the enclosure. Thus, a dead volume of 100 cm$^3$ for an enclosure allowing a raised internal pressure of 1 bar makes it possible, in the event of a leak rate of $1\times10^{-8}$ mbar·l/s, and operating at 100 bar, to obtain a run of 1200 days, namely about 3 years, before having to consider servicing during which the enclosure is removed, opened in order to withdraw the gas that has been stored therein through leakages, and reclosed. By contrast, during these 1200 days, the internal pressure will not have stopped rising and will therefore be higher than atmospheric pressure if a vacuum has not been created beforehand. In the event of depressurization, a deformation will be remarked which may go so far as to eliminate the air gap (Δ) if a vacuum has not been created from the outset in the dead volume 9, or 109, respectively.

When, as according to the present invention, a dead volume of a few hundred cm$^3$ is created in the sleeved bearing enclosure with the bearing closed off while maintaining the vacuum, there is no longer any risk of damage to the bearing for a very long time in the event of depressurization.

In particular, any gas migrating into the enclosure as a result of leaks will be unable to create an explosive atmosphere because of the absence of oxygen.

There is an internal-pressure zone of between 0 and 1 bar absolute in which whatever the external pressure higher than 1 bar absolute there will be no deformation of the thin chamber 3, or 103, respectively, because the external pressure always keeps it pressed against the core 41, 141, respectively.

The life or preventive maintenance or service interval is increased very significantly.

Thus, in the example of an axial thrust bearing with a diameter of 450 mm fitted with a sleeve 103 with a thickness of 0.5 mm, manufactured with a created internal volume of 200 cm$^3$, but which has not been closed under vacuum, it takes 240 days (about 8 months) for an internal pressure that becomes dangerous (or even catastrophic) in the event of depressurization to be reached (0.1 bar, namely 1.1 bar absolute).

By contrast, if the enclosure has been closed under vacuum and the same internal volume 109 is under vacuum from the outset, this same internal pressure of 1.1 bar will be reached in 2640 days (7.2 years).

For 2400 days (6.6 years) the internal pressure will be below 1 bar absolute, that is to say that, even if the gaseous atmosphere in which the rotor shaft 101 and the rotor armature 106 are immersed becomes depressurized, the can or sleeve 103 will experience no deformation.

It is standard practice in the gas industries in which magnetic bearings are used (compressors, turbo-expanders) for preventive maintenance to be carried out every 5 years. During this maintenance, the emptying and re-evacuating of the enclosure may be envisioned. Such a design involving introducing an evacuated dead volume therefore meets this requirement well.

It will be noted that the invention applies to radial and axial sleeved magnetic bearings, to canned electric motors, whether or not the motor can is made of metal or nonmetal, and likewise to sleeved magnetic bearing assemblies associated with sleeved detectors of the inductive type or even with axial or radial sleeved detectors of the inductive type considered in isolation and each comprising a rotor armature secured to the rotor and a stator armature comprising a ferromagnetic core and windings, which stator armature is positioned in a protective metal enclosure comprising, as in the case of the magnetic bearings proper, a solid part secured to the ferromagnetic body or coinciding therewith, a thin can or sleeve and a hermetic passage for wires supplying the windings of the stator armature. In this case, as in the case of magnetic bearings proper, a potting compound does not occupy all the residual gaps left empty inside the protective metal enclosure but rather a dead volume in which the pressure is below atmospheric pressure is created inside the protective metal enclosure.

However, because the detectors each occupy a smaller volume than an associated magnetic bearing, the dead volume formed near the hermetic passage and in which a vacuum has been created through a drilling later plugged by a blanking plug welded into position maintaining the vacuum, may have a reduced capacity of between 50 and 150 cm$^3$ for example.

Various modifications and additions may be incorporated into the embodiments described, without departing from the scope of the invention.

Thus, during the method of manufacturing a rotary machine according to the invention, it is possible for this machine to be subjected to a thermal cycle or to some other treatment that will detach the potting compound 7, or 107, from the surfaces of the enclosure 2, 3, 8, or 102, 103, 108, respectively, so that any part situated near the can or sleeve 3 or 103, respectively, will be in communication in terms of pressure with the dead volume 9, or 109, respectively.

The invention claimed is:

1. A canned or sleeved rotary machine comprising:
    a rotor that is disposed in a particle-laden, acidic or corrosive liquid or gaseous atmosphere; and
    a functional electrical assembly, the functional electrical assembly including:
        a rotor armature secured to the rotor and placed in said acidic or corrosive liquid or gaseous atmosphere, and
        a stator armature that is secured to a stationary support and positioned facing said rotor armature, the stator armature comprising at least one winding and a ferromagnetic body that are positioned in a protective metal enclosure comprising:
            a solid part secured to the stationary support or coincident therewith,
            a thin can or sleeve, and
            a hermetic passage for wiring supplying said windings;
            wherein a potting compound fills residual internal gaps left in the ferromagnetic body, the windings, and the wiring, and
            wherein a dead volume in which the pressure is below atmospheric pressure is created inside the protective metal enclosure.

2. The machine as claimed in claim 1, wherein said dead volume is formed behind said hermetic passage.

3. The machine as claimed in claim 1, wherein the protective metal enclosure comprises a drilling so that the vacuum can be created in said dead volume and a blanking plug welded in position to plug said drilling while at the same time maintaining the vacuum.

4. The machine as claimed in claim 1, wherein the dead volume has a capacity in excess of 100 cm$^3$.

5. The machine as claimed in claim 1, wherein the thin can or sleeve has a thickness of between 0.3 and 2 mm.

6. The machine as claimed in claim 1, wherein the air gap (Δ) between the rotor armature and the stator armature is between 0.4 and 3 mm.

7. The machine as claimed in claim 1, wherein the thin can or sleeve is made of at least one of magnetic, 17-4 Precipitation Hardening Type 630 stainless steel alloy, non-magnetic, Type 316L stainless steel, non-magnetic, Type 904L stainless steel or INCONEL.

8. The machine as claimed in claim 1, wherein the functional electrical assembly consists of an axial magnetic bearing with a rotor armature in the form of a disk perpendicular to the rotor.

9. The machine as claimed in claim 1, wherein the functional electrical assembly consists of a radial magnetic bearing.

10. The machine as claimed in claim 1, wherein the functional electrical assembly consists of a canned electric motor.

11. The machine as claimed in claim 1, wherein the functional electrical assembly consists of a sleeved detector associated with a magnetic bearing.

* * * * *